3,695,894
METHOD OF GLAZING HARD CANDY COATINGS
Allen S. Hum, Minneapolis, Minn., assignor to General Mills, Inc.
No Drawing. Filed May 27, 1970, Ser. No. 41,097
Int. Cl. A23g 3/00
U.S. Cl. 99—134 R      3 Claims

ABSTRACT OF THE DISCLOSURE

Glazing hard candy coatings by means of infrared heat and exposure.

---

This invention relates to a process for rapid glazing of hard candy coatings on base products. In particular, it relates to glazing hard candy coatings by means of infrared heating.

Among base products that are commonly coated with glazed hard candy are cereal or starch based products such as cereal flakes, puffed cereals, popcorn and cereal based snacks, starch based snack items and puffed starch based snack items having surfaces capable of being moistened. Dried fruits and fruits such as cherries can be hard candy coated. Although it is not common that protein based items are hard candy coated, such items can also be coated. The present invention can be used in glazing hard candy coatings on these base products. The formulation of the base product, however, it is not part of the present invention.

Traditionally, base products are coated with glazed hard candy by first enrobing the base product with hard candy particles. After enrobement, the hard candy particles distributed on and adhering to the surfaces of the base product are glazed by subjecting them to temperatures of about 180° F. to 200° F. in an air oven for a period of from about 25 to 60 minutes. The hard candy particles fuse together forming a continuous coating. Air oven temperatures above about 200° F. cause blistering the coating which results in a poor quality appearing product.

Hard candy formulations traditionally used are composed essentially of sucrose and a second saccharide component such as corn syrup, invert sugar, dextrins, maltodextrins, dextrose or mixtures thereof. Table 1 shows some representative compositions from the literature. Flavoring and coloring agents present in small amounts are not shown.

TABLE 1[1]

| Type of candy | Moisture, percent by wt. | Sucrose, percent by wt. | Invert sugar, percent by wt. | Corn syrup solids, percent by wt. |
|---|---|---|---|---|
| Plain | 1.0–1.5 | 40–100 | 0.10 | 0–60 |
| Brittle | 1.0–1.5 | 25–55 |  | 20–50 |

[1] Data from "The Experimental Study of Foods," Ruth M. Grisewald, p. 457, Houghton Mifflin Co., Boston.

The hard candy ingredients are melted together. The composite is cooled under controlled conditions to produce a non-crystalline mass, namely hard candy.

For enrobing purposes, a portion of the hard candy to be coated onto the base product is dissolved in water. Generally, a solution of from about 10% to 70% hard candy by weight of the solution is used. The aqueous solution is then applied to the surfaces of the base product to moisten but not soften the surfaces. The moistening step can be achieved by placing the base product in an enrober and spraying the hard candy solution in amounts of from about 20% to 50% by weight of the base product onto the tumbling base product pieces. Once the surfaces of the base product pieces are moist, the remainder of the hard candy to be added is distributed onto and adhered to the moistened surfaces usually by spraying or dusting dry hard candy in pulverized form onto the base product pieces in the enrober. The total amount of combined dissolved and dry hard candy that can be coated onto the base product is from about 3% to 125% by weight of the base product.

As described above, the product after enrobing has heretofore been subjected to prolonged heating in an air oven to obtain proper glazing.

It has now been found that good glazes can be obtained by subjecting the hard candy enrobed base products to infrared heating at temperatures from about 150° to 500° F. for a period of from about 15 to 90 seconds and preferably at a temperature from about 170° to 430° F. for a period of about 20 to 60 seconds. This process can be used with the hard candy formulations and the base products heretofore glazed in air ovens.

Good glazes have been obtained by using a Fostoria Even Ray Infrared Oven manufactured by Fostoria Pressed Steel Corp. This oven has a wire belt for carrying the enrobed product and six infrared burner units above and six units below the belt. Each infrared unit is 11 inches wide, 22 inches long and positioned 11 inches away from the belt surface. Each heating unit contains three heating elements, two quartz and one calrod lamp with 1600 watts per quartz lamp and 1000 watts per calrod lamp. The watt density is 17.35 watts/in.$^2$ of heating unit surface. Each element in the heating unit is individually controlled. Best results were obtained when, counting from the inlet end, top heating units #1 and #3 and bottom heating units #4, #5 and #6 were used and the enrobed product pieces were passed through the oven in a layer one piece deep. Different infrared heat source arrangements can readily be adapted to the process of this invention. As shown in Example III, glazing time can be reduced by using higher watt densities and bringing the heating unit closer to the product. By using agitating belts such as a vibrating belt or a fluid bed to bring each enrobed product piece into contact with the infrared energy, beds having a thickness greater than one piece in depth can be used. The high energy from the heating units melts the coating of puverized hard candy, drives out the moisture and then seals the surface into a smoth glaze. After glazing is completed, the coated product releases from the belt most readily while the coating is still slightly viscous.

The time required to obtain glazing is influenced by distance of heating units from product, watt density of the heating units and reflective surfaces. Decreased distance between the heating units and the product reduces the time required for glazing. Increasing the watt density of the heating elements reduces the time required for glazing. Using reflection surfaces to concentrate the energy reduces the time required for glazing. The effect of these variables will be better understood from the specific examples set out below wherein different heating conditions were used.

EXAMPLE I

This example illustrates the enrobing of a snack item with a caramel coating and subsequent glazing in a Fostoria Oven described above.

The snack item was a puffed, starch based product shaped in the likeness of a daisy.[1] Four hundred sixty three grams of the snack item was put in an enrober and tumbled by the rotation of the enrober. One hundred eighty grams of an aqueous caramel hard candy solu-

[1] Sold by General Mills, Inc. under the trade name "Daisy*s."

tion was sprayed onto the snack item as the snack item was being tumbled. The aqueous hard candy solution contained 66% caramel hard candy by weight of the solution. The composition of the caramel hard candy was:

| | Percent by weight |
|---|---|
| Brown sugar | 71.80 |
| Corn syrup | 11.93 |
| Water | 11.93 |
| Molasses | 2.30 |
| Salt | 1.20 |
| Soda | .60 |
| Imitation butter flavor | .24 |
| | 100.00 |

After spraying of the solution, 500 grams of powdered hard candy having the same composition as the hard candy in the solution was sprayed onto the tumbling snack item. The final enrobed weight of the snack item was 977 grams. In the enrobing, 166 grams of solution and powdered hard candy were lost.

The enrobed snack was then placed in the Fostoria Oven described above in a layer one snack piece deep. In the oven, heating elements #1, #2 and #3 and bottom heating elements #1, #2 and #3 were on. The temperature in the oven was 400° F. and actual glazing time was 45 seconds. The weight of the product finally collected was 962 grams. During the glazing operation there was a net weight loss of water and caramel sticking to the belt amounting to 1.54% by weight of the product. The resulting product had a smooth, uniform glaze.

EXAMPLE II

This example illustrates the effect of oven temperatures upon glaze quality. The same snack item, hard candy composition and enrobing procedure set out in Example I were used. The revolutions per minute of the enrober were decreased to reduce breakage of the snack item. One hundred eight grams solution and 500 grams hard candy powder were sprayed on 485 grams of the snack item. The weight of the enrobed snack item was 1041 grams. The enrobed snack item was passed through the Fostoria Oven in three separate batches using a 40 second glazing time and different oven temperatures. The results are as follows:

| Oven temperature (° F.): | Glaze obtained |
|---|---|
| 435 | Good glaze. |
| 240 | Do. |
| 170 | Do. |

EXAMPLE III

This example illustrates the effect of increased watt density and reduced distance between infrared source and product upon glazing time. A starch based snack item in the shape of a daisy [2] was enrobed with hard candy following the procedure set out in Example I. The enrobed snack item was glazed using quartz plate infrared units having a watt density of 24.3/in.² and positioned three inches above and below the snack item. The actual glazing time was 15 seconds. A smooth, continuous, uniform glaze was obtained.

EXAMPLE IV

Listed below in tabulated form are a variety of snack items and the time period and oven temperature which produced good, smoothly glazed product. The products were enrobed within the same manner as in Example I and glazed in a Fostoria Oven described above.

| Snack Item | Oven temperature, °F. | Glaze period, seconds |
|---|---|---|
| Starch based snack in daisy shape [1] | 360 | 24 |
| Starch based snack in daisy shape [1] | 365 | 30 |
| Corn puffs | 365 | 30 |
| Starch based snack in daisy shape [1] | 430 | 35 |

[1] Sold by General Mills, Inc. under the trade name "Daisy*s."

Flavorings which have been incorporated into the hard candy are caramel, lemon, butterscotch, strawberry and pineapple. Generally any of the flavors commonly used in the hard candy can be used in the hard candy enrobing the base product.

The embodiments of the invention in which an exclusive property or privilege is claimed are defined as follows:

1. A process for glazing hard candy coatings on a base product comprising:
   moistening the surfaces of the base product with an aqueous solution comprised of from about 10% to 70% dissolved hard candy by weight of the solution, said aqueous solution being applied in amounts of from about 20% to 50% by weight of the base product,
   distributing hard candy in dry, pulverized form onto the moistened surface of the base product in amounts so that the total amount of dry and dissolved hard candy is from about 3% to 125% by weight of the base product, and
   glazing the hard candy distributed on and adhering to the surfaces of the base product by means of exposing said hard candy to infrared energy which creates a temperature about said coating of from about 170° F. to 430° F. for a period of from about 20 to 60 seconds.

2. The process of claim 1 wherein the base product is a cereal based product.

3. The process of claim 2 wherein the base product is a starch based product.

References Cited

UNITED STATES PATENTS

| 3,094,947 | 6/1963 | Green | 99—134 R UX |
| 3,167,035 | 1/1965 | Benson | 118—20 X |
| 1,485,115 | 2/1924 | Guittard | 107—54 H |

RAYMOND N. JONES, Primary Examiner

J. M. HUNTER, Assistant Examiner

U.S. Cl. X.R.

99—83

[2] Same as Example I.

PO-1050
(5/69)

UNITED STATES PATENT OFFICE
CERTIFICATE OF CORRECTION

Patent No. 3,695,894     Dated  October 3, 1972

Inventor(s) Allen S. Hum

It is certified that error appears in the above-identified patent and that said Letters Patent are hereby corrected as shown below:

Column 1, line 40, "ing the" should read -- ing in the --; line 57, "0.10" should read -- 0-10 --. Column 4, line 47, "claim 2" should read -- claim 1 --.

Signed and sealed this 6th day of March 1973.

(SEAL)
Attest:

EDWARD M. FLETCHER, JR.
Attesting Officer

ROBERT GOTTSCHALK
Commissioner of Patents